(12) United States Patent
Croak et al.

(10) Patent No.: US 7,778,402 B1
(45) Date of Patent: Aug. 17, 2010

(54) METHOD AND APPARATUS FOR ROUTING INCOMING CALLS TO ACTIVE NETWORK ENDPOINTS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1345 days.

(21) Appl. No.: 11/026,409

(22) Filed: Dec. 30, 2004

(51) Int. Cl.
*H04M 3/42* (2006.01)

(52) U.S. Cl. .............................. 379/211.01; 379/201.1; 379/211.02; 379/212.01; 370/353

(58) Field of Classification Search .................. 370/353; 340/531; 709/224, 225, 223; 379/211.01, 379/201.1, 211.02, 212.01
See application file for complete search history.

(56) References Cited

U.S. PATENT DOCUMENTS

| 2002/0085701 | A1* | 7/2002 | Parsons et al. ......... 379/211.01 |
| 2003/0217142 | A1* | 11/2003 | Bobde et al. ................ 709/224 |
| 2005/0068166 | A1* | 3/2005 | Baker ......................... 340/531 |

* cited by examiner

*Primary Examiner*—Thjuan K Addy

(57) ABSTRACT

The invention comprises a method and apparatus for routing an incoming call to at least one network endpoint in a communication network. Specifically, the method comprises identifying at least one registered network endpoint associated with a user in response to an incoming call destined for the user, obtaining presence information associated with at least one active network endpoint from the at least one registered network endpoint, and routing the incoming call towards the at least one active network endpoint using the presence information.

14 Claims, 4 Drawing Sheets

METHOD AND APPARATUS FOR ROUTING INCOMING CALLS TO ACTIVE NETWORK ENDPOINTS

FIELD OF THE INVENTION

The invention relates to the field of communication networks and, more specifically, to routing incoming calls to active network endpoints.

BACKGROUND OF THE INVENTION

In general, telephony service providers often provide "call forwarding" service features that enable subscribers to forward incoming calls from one network endpoint to at least one other network endpoint. Unfortunately, such "call forwarding" service features require the subscriber to manually configure call forwarding information (e.g., a phone number to which the calls should be forwarded) by entering such information using a network interface (e.g., a touchtone interface, a web-based interface, and the like).

Accordingly, a need exists in the art for a method and apparatus for routing an incoming call to at least one active network endpoint associated with the user for which the incoming call is destined.

SUMMARY OF THE INVENTION

In one embodiment, the invention comprises a method and apparatus for routing an incoming call to at least one network endpoint in a communication network. Specifically, the method comprises identifying at least one registered network endpoint associated with a user in response to an incoming call destined for the user, obtaining presence information associated with at least one active network endpoint from the at least one registered network endpoint, and routing the incoming call towards the at least one active network endpoint using the presence information.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) network architecture; however, the methodology of the invention can readily be applied to other network architectures. An IP network is broadly defined as a network that uses Internet Protocol to exchange data packets. A VOIP network is broadly defined as a network that is capable of carrying voice signals as packetized data over an IP network. In general, the present invention enables a service provider to offer "call forwarding" service features whereby incoming calls destined for a user are routed to active network endpoints associated with the user. As such, the present invention obviates the need for the user to manually configure call forwarding information for routing incoming calls to at least one other network endpoint.

Figure 1:
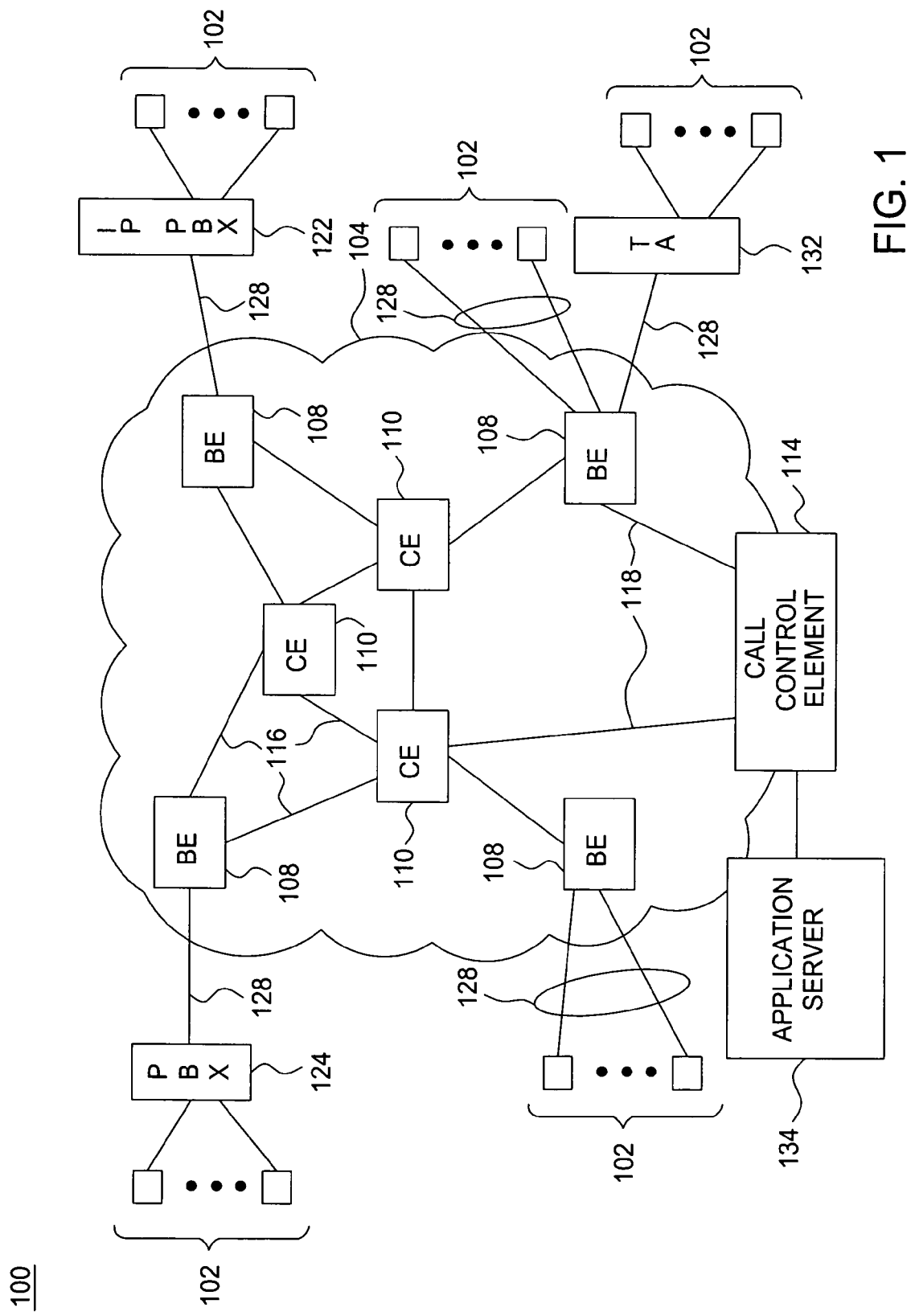
FIG. 1 depicts a high level block diagram of an Internet Protocol (IP) network architecture.

FIG. 1 depicts an exemplary embodiment of an Internet Protocol network architecture in accordance with the present invention. The IP network architecture 100 comprises a plurality of network endpoints 102 and a packet-switched network 104. The packet-switched network 104 illustratively comprises a plurality of border elements (BEs) 108, a plurality of core elements (CEs) 110, and a call control element (CCE) 114. The BEs 108 and CEs 110 communicate via core communication links 116. The CCE 114 may be coupled to at least a portion of the CEs 110 and at least a portion of the BEs 108 through communication link(s) 118. The packet-switched network 104 may comprise at least one of: an IP network, an asynchronous transfer mode (ATM) network, a frame relay network, and like networks known in the art. For example, packet-switched network 104 may comprise a voice-over-IP (VOIP) network.

In general, a CE comprises a network element (such as a router, switch, cross-connect system, server, and the like) that facilitates communications between the BEs 108. In general, a BE comprises a network element (such as a router, switch, cross-connect system, server, and the like) through which network endpoints 102 connect to packet-switched network 104. A BE typically performs functions such as routing, switching, security, admission control, and the like. In one embodiment, a BE translates between Session Initiation Protocol (SIP) and access protocols for facilitating communications within a service provider IP infrastructure (illustratively, packet-switched network 104). For purposes of clarity by example, three CEs 110 are depicted in FIG. 1. It is to be understood that packet-switched network 104 may include fewer or more CEs. Similarly, although four BEs 108 are depicted in FIG. 1, packet-switched network 104 may include fewer or more BEs. Although the BEs 108 are depicted as being directly connected to the CEs 110, other intervening equipment (not shown) may be deployed.

The CCE 114 resides within the VoIP network infrastructure and communicates with the BEs using SIP over the underlying packet-switched network 104. The CCE 114 is typically implemented as a Media Gateway Controller and performs network wide call control related functions, as well as interacts with the appropriate VoIP service related servers when necessary. The CCE 114 functions as a SIP back-to-back user agent and is a signaling endpoint for all call legs between BEs 108 and CCE 114. The CCE 114 may need to interact with various VoIP related servers in order to complete a call requiring certain service specific features (e.g. translation of an E.164 voice network address into an IP address). For purposes of clarity by example, packet-switched network 104 is depicted as comprising one CCE 114. It is to be understood, however, that packet-switched network 104 may include a plurality of CCEs, each configured to control various BEs, servers, and the like.

The application server (AS) 134 is coupled to the packet-switched network 104 via a connection to CCE 114. The AS 134 comprises a system for storing data, managing network resources, and performing other functions. Depending on the particular embodiment, at least one AS may be coupled to at least one CCE. Similarly, although AS 134 is depicted as directly coupled to the packet-switched network 104, the server (or plurality of servers) may only be connected to the network via the CCE (or plurality of CCEs). In one embodiment, the AS 134 functions as a presence server, storing network endpoint presence information and providing network endpoint presence information to a CCE in response to a query by the CCE for retrieving the presence information.

A network endpoint 102 typically comprises a user terminal (such as a telephone, computer, and the like) by which one or more users communicate with other users in IP network architecture 100. Some of the network endpoints 102 communicate with the BEs 108 via edge communication links 128. A network endpoint (such as a time division multiplexing (TDM) phone, an IP phone, an Integrated Services Digital Network (ISDN) phone, a computer, and the like) is able to establish a connection with a BE through the communication links 128. In one embodiment, at least a portion of the network endpoints 102 are capable of being turned off (inactive state) and on (active state). In another embodiment, at least a portion of the network endpoints 102 are capable of being toggled between an active state (in which calls may be received) and an inactive state (in which calls cannot be received).

In one embodiment, a network endpoint connects to packet-switched network 104 through a circuit-switched connection with a BE. In another embodiment, a network endpoint connects to packet-switched network 104 through an IP connection with a BE. In other embodiments, a network endpoint may connect to a border element via a Signaling System Seven (SS7) connection, a Digital Subscriber Line (DSL) connection, a cable television connection, a customer managed router connection, a customer managed gateway connection, and like access technologies as known in the art. Those skilled in the art will appreciate that numerous other techniques for establishing a connection between a network endpoint and a BE exist in the art.

In one embodiment, some of the network endpoints 102 (e.g., TDM phones) connect to a BE through an edge communication link via a TDM Private Branch Exchange (PBX) 124. In another embodiment, other network endpoints 102 (e.g., an IP phone) connect to a BE through an edge communication link via an IP Private Branch Exchange (IP-PBX) 122. In another embodiment, other network endpoints 102 (e.g., computer) connect to a BE through an edge communication link directly. In still another embodiment, other network endpoints 102 (e.g., ISDN phone) connect to a BE through an edge communication link via a terminal adapter (TA) 132.

Figure 2:
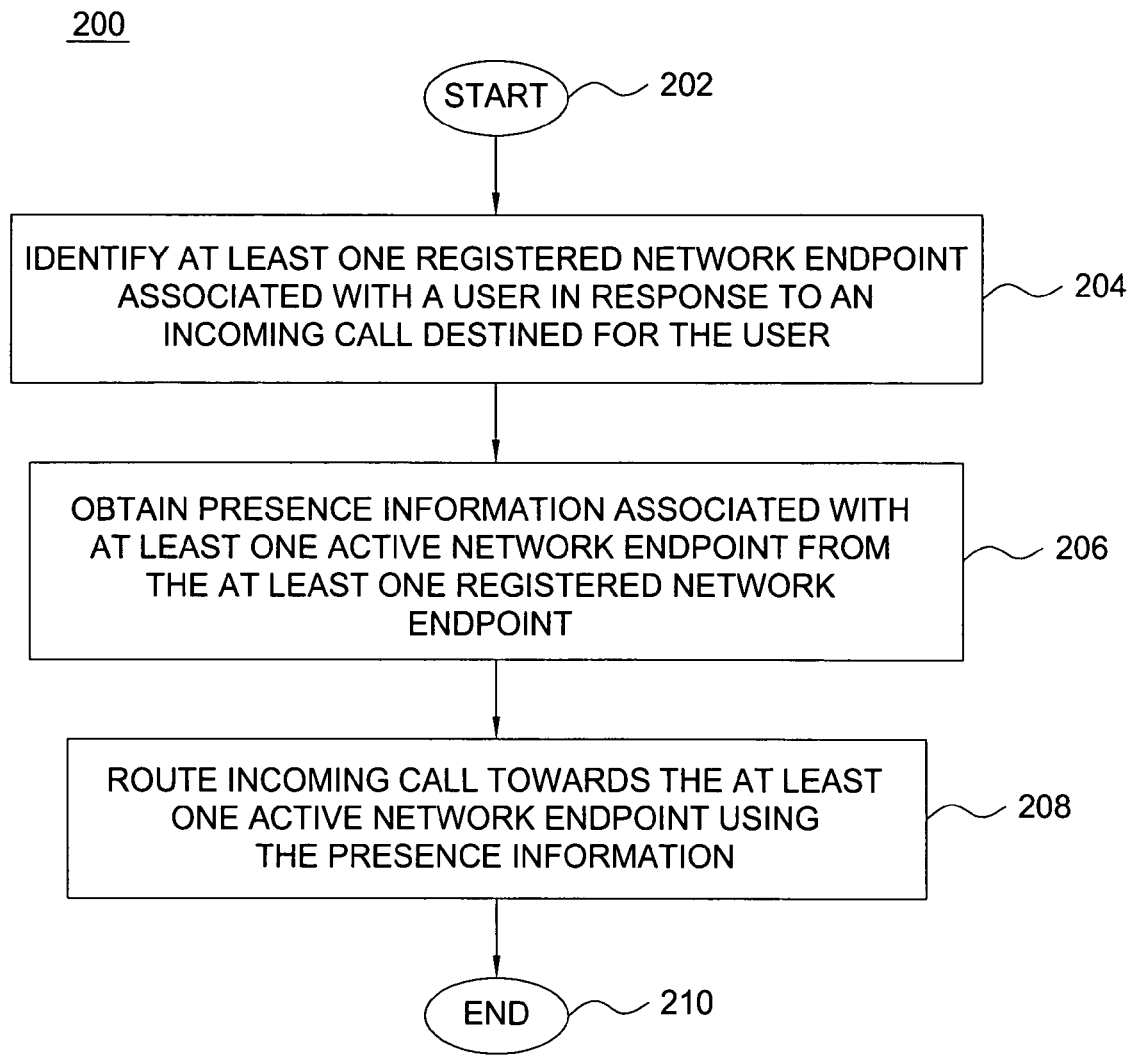
FIG. 2 depicts a flow diagram of a method according to one embodiment of the invention.

FIG. 2 depicts a flow diagram of a method according to one embodiment of the invention. Specifically, method 200 of FIG. 2 comprises a method for routing an incoming call to at least one network endpoint in a communication network. The method 200 is entered at step 202 and proceeds to step 204. At step 204, at least one registered network endpoint associated with a user is identified in response to an incoming call destined for the user. At step 206, presence information associated with at least one active network endpoint is obtained, where the at least one active network endpoint comprises at least one registered network endpoint. At step 208, the incoming call is routed towards the at least one active network endpoint using the presence information. The method 200 then proceeds to step 210 where method 200 ends.

Figure 3:
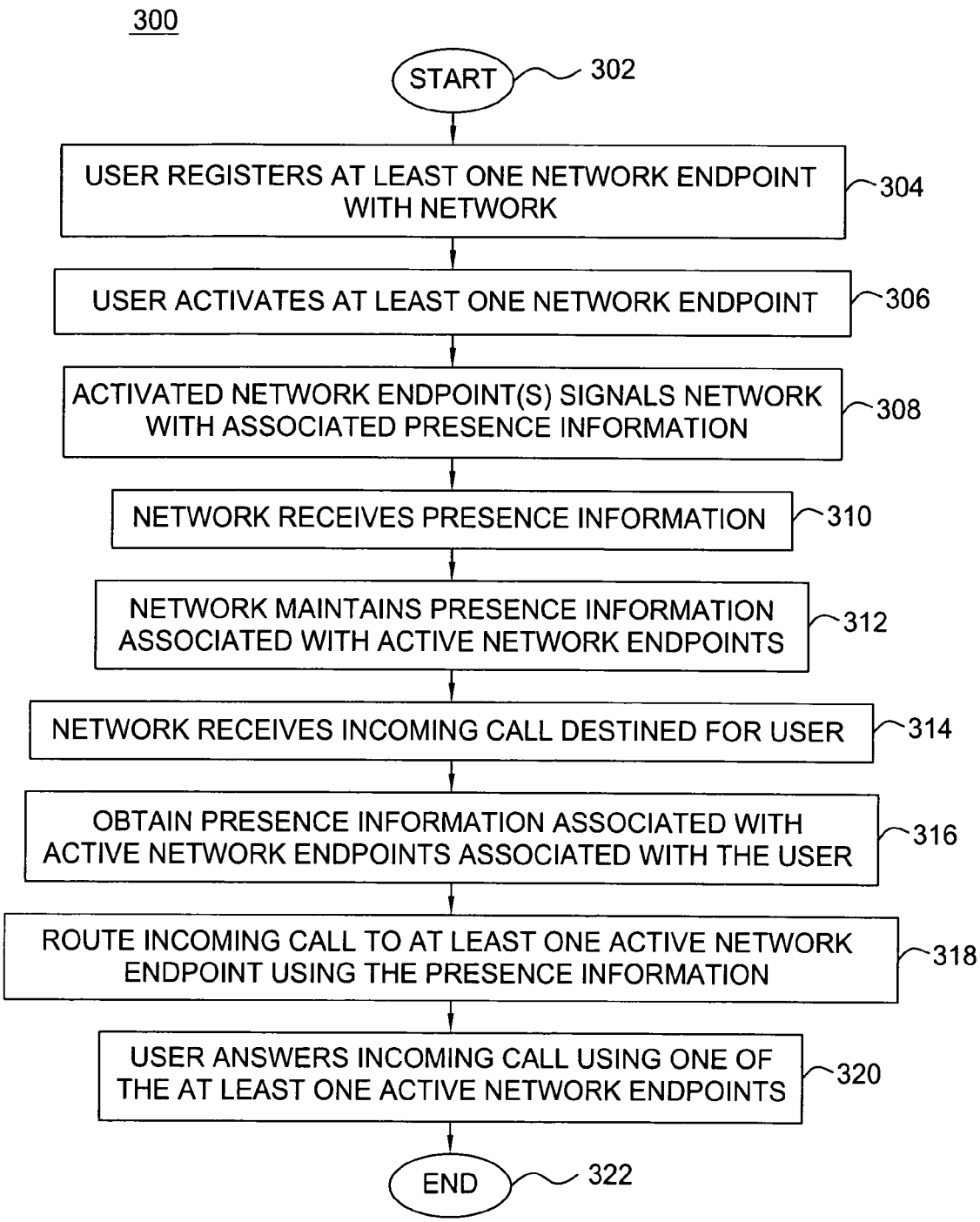
FIG. 3 depicts a detailed flow diagram of the method depicted in FIG. 2.

FIG. 3 depicts a detailed flow diagram of the method depicted in FIG. 2. As such, a single step as depicted in FIG. 2 may correspond to multiple steps as depicted in FIG. 3. Specifically, the method 300 of FIG. 3 comprises a method routing an incoming call to at least one active network endpoint in a communication network. Although depicted as being performed serially, those skilled in the art will appreciate that at least a portion of the steps of method 300 may be performed contemporaneously. The method 300 is entered at step 302 and proceeds to step 304.

At step 304, a user registers at least one network endpoint with a network. In one embodiment, registration of a network endpoint may comprise subscribing to a service whereby the service provider configures the network to recognize the network endpoint. For example, configuring the network to recognize the network endpoint may comprise various signaling between the network and the network endpoint, as well as manual actions by service provider service provisioning technicians. In one embodiment, in which the user already subscribes to service from the service provider, the user may register additional network endpoints with the service provider (e.g., adding an additional IP phone).

At step 306, a user activates at least one network endpoint registered with the network. In one embodiment, a network endpoint may be activated by a user by turning on the device. In another embodiment, a user may activate a network endpoint using an active/inactive toggle switch on the network endpoint. For example, a user may register three network endpoints with the network (e.g., a home office IP phone, a home IP phone, and a work office IP phone). As such, when the user leaves work, the user may toggle the work office IP phone to an inactive state and, upon arriving home, transition both the home office IP phone and the home IP phone to an active state for receiving incoming calls at home.

At step 308, the activated network endpoint(s) signals the network with associated presence information. As such, transitioning of a state associated with a network endpoint from inactive to active triggers transmission of presence information from the network endpoint to the at least one network element within the service provider network. In one embodiment, presence information may comprise information for enabling the network to locate the network endpoint in order to route incoming calls to the active network endpoint. As such, in one embodiment, presence information may comprise location information, an IP address, routing information, and like presence information as known in the art.

At step 310, the network receives the presence information transmitted by a network endpoint upon transitioning of the network endpoint to an active state. In one embodiment, the presence information is transmitted by the network endpoint is received by a BE with which the network endpoint is associated, and the BE routes the presence information to a CCE (illustratively, CCE 114) associated with the BE. In one embodiment, upon receiving the presence information, the CCE forwards the presence information to a presence server (e.g., AS 134) which stores the presence information associated with the active network endpoint.

At step 312, the network maintains the presence information associated with the active network endpoints. In other words, the presence server stores the presence information associated with a network endpoint as long as the state associated with the network endpoint remains active. As such, upon detection by the CCE that the state associated with a network endpoint has transitioned from active to inactive, the CCE signals the presence server to clear the presence information associated with the inactivated network endpoint.

In one embodiment, the presence information associated with the inactivated network endpoint may be deleted from the presence server (i.e., cleared from at least one database associated with the presence server). In another embodiment, at least a portion of the presence information associated with the inactivated network endpoint is maintained by the presence server, and at least one state parameter maintained by the presence server is set from active to inactive to prevent the routing of incoming calls to an inactive network endpoint.

At step 314, the network receives an incoming call destined for the user. In one embodiment, the incoming call is routed from one of the BEs associated with the calling party network endpoint to the CCE. The incoming call identifies the user as the intended recipient of the incoming call. In one embodiment, the CCE may utilize user information associated with the incoming call in order to identify the registered network endpoints associated with the user for which the incoming call is destined. In another embodiment, the CCE may utilize user information associated with the incoming call in order to obtain presence information for active network endpoints associated with the user for which the incoming call is destined.

At step 316, presence information associated with each active network endpoint is obtained. In one embodiment, the CCE may identify registered network endpoints associated with the user, as well as a state associated with each of the registered network endpoints. In this embodiment, the CCE may use the states associated with the registered network endpoints in order to query the presence server for retrieving presence information associated with registered network endpoints for which the state associated with the network endpoints is active.

In another embodiment, the CCE may query the presence server using at least one user identifier. In one such embodiment, the CCE retrieves presence information associated with network endpoints for which presence information is maintained by the presence server (i.e., for network endpoints in an active state). In another embodiment, in which presence information is maintained by the presence server for inactive network endpoints, the CCE may retrieve presence information for active network endpoints by querying for presence information for network endpoints for which the state is active.

At step 318, the incoming call is routed to at least one active network endpoint using the presence information. In one embodiment, the incoming call is routed to at least one active network endpoint using at least a portion of the presence information. In continuation of the above example, assuming that two of the registered network endpoints are active (e.g., the home office IP phone and the home IP phone), the CCE routes the incoming call to the two active network endpoints using presence information associated with each of the two active network endpoints. In other words, the CCE signals the two active network endpoints for informing the called party of the incoming call.

In one embodiment, routing of the incoming call to active network endpoints is performed serially. In continuation of the above example, the CCE may route the incoming call to the home office IP phone first. In this example, if the user answers the call, the call is not routed to the home IP phone; however, if the call is not answered via the home office IP phone the CCE routes the call to the home IP phone. In another embodiment, routing of the incoming call to active network endpoints is performed contemporaneously. In continuation of the above example, the CCE may route the incoming call to the home office IP phone and to home IP phone simultaneously.

At step 320, the user answers the incoming call using one of the active network endpoints to which the incoming call was routed by the CCE. The method 300 then proceeds to step 322 where the method 300 ends. Although described herein as simply routing the incoming call to active network endpoints, it should be noted that in one embodiment, such routing may comprise generating at least one call message for each active network endpoint using at least a portion of the presence information associated with each active network endpoint, and transmitting the at least one call message towards the at least one active network endpoint.

Figure 4:
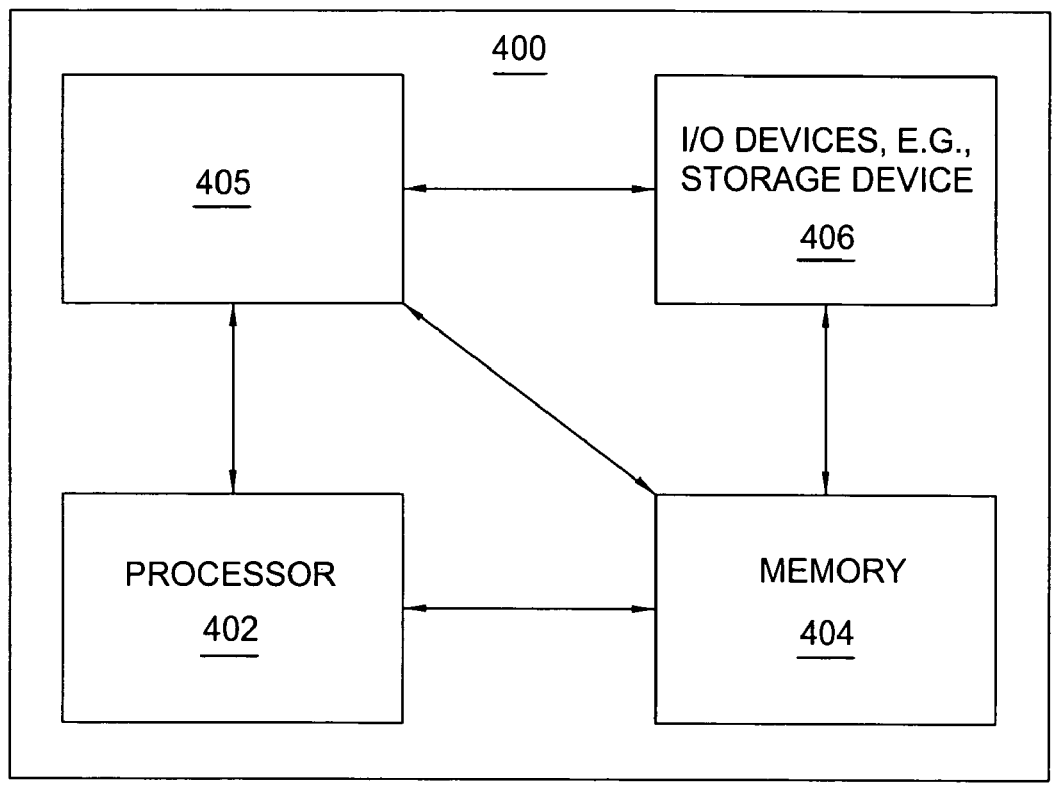
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a call routing module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present call routing module or process 405 can be loaded into memory 404 and executed by processor 402 to implement the functions as discussed above. As such, the present call routing process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for routing an incoming call to at least one network endpoint in a communication network, comprising:
   identifying at least one registered network endpoint associated with a user in response to an incoming call destined for said user;
   obtaining presence information associated with at least one active network endpoint from said at least one registered network endpoint in response to said incoming call;
   routing said incoming call towards said at least one active network endpoint using said presence information, wherein said routing comprises:
      generating at least one call message for said at least one active network endpoint using said presence information; and
      transmitting said at least one call message towards said at least one active network endpoint; and
   clearing said presence information associated with one of said at least one active network endpoint in response to said one of said at least one active network endpoint transitioning from an active state to an inactive state, wherein said clearing comprises deleting said presence information associated with said one of said at least one active network endpoint.

2. The method of claim 1, further comprising:
   routing said incoming call towards said at least one active network endpoint contemporaneously.

3. The method of claim 1, further comprising:
   routing said incoming call towards said at least one active network endpoint serially.

4. The method of claim 1, further comprising:
   registering at least one network endpoint with said communication network.

5. The method of claim 1, further comprising:
   receiving said presence information associated with said at least one active network endpoint in response to a state associated with said at least one registered network endpoint transitioning from an inactive state to an active state.

6. The method of claim 5, further comprising:
maintaining said presence information associated with said at least one active network endpoint in response to said state remaining in said active state.

7. A computer readable medium encoded with software, that, when executed by a computer, causes the computer to perform a method comprising:
identifying at least one registered network endpoint associated with a user in response to an incoming call destined for said user;
obtaining presence information associated with at least one active network endpoint from said at least one registered network endpoint in response to said incoming call;
routing said incoming call towards said at least one active network endpoint using said presence information, wherein said routing comprises:
generating at least one call message for said at least one active network endpoint using said presence information; and
transmitting said at least one call message towards said at least one active network endpoint; and
clearing said presence information associated with one of said at least one active network endpoint in response to said one of said at least one active network endpoint transitioning from an active state to an inactive state, wherein said clearing comprises deleting said presence information associated with said one of said at least one active network endpoint.

8. The computer readable medium of claim 7, further comprising:
routing said incoming call towards said at least one active network endpoint contemporaneously.

9. The computer readable medium of claim 7, further comprising:
registering said at least one network endpoint with said communication network.

10. The computer readable medium of claim 7, further comprising:
receiving said presence information associated with said at least one active network endpoint in response to a state associated with said at least one registered network endpoint transitioning from an inactive state to an active state.

11. The computer readable medium of claim 10, further comprising:
maintaining said presence information associated with said at least one active network endpoint in response to said state remaining in said active state.

12. An apparatus for routing an incoming call to at least one network endpoint in a communication network, comprising:
means for identifying at least one registered network endpoint associated with a user in response to an incoming call destined for said user;
means for obtaining presence information associated with at least one active network endpoint from said at least one registered network endpoint in response to said incoming call;
means for routing said incoming call towards said at least one active network endpoint using said presence information, wherein said means for routing generates at least one call message for said at least one active network endpoint using said presence information, and transmits said at least one call message towards said at least one active network endpoint; and
means for clearing said presence information associated with one of said at least one active network endpoint in response to said one of said at least one active network endpoint transitioning from an active state to an inactive state, wherein said means for clearing deletes said presence information associated with said one of said at least one active network endpoint.

13. The apparatus of claim 12, further comprising:
means for receiving said presence information associated with said at least one active network endpoint in response to a state associated with said at least one registered network endpoint transitioning from an inactive state to an active state.

14. The apparatus of claim 13, further comprising:
means for maintaining said presence information associated with said at least one active network endpoint in response to said state remaining in said active state.

* * * * *